US009379365B2

(12) United States Patent
Schmieder et al.

(10) Patent No.: US 9,379,365 B2
(45) Date of Patent: Jun. 28, 2016

(54) CELL FRAME FOR EREV GEN2 BATTERY MODULE (LIQUID FIN CONCEPT) WITH HEAT EXCHANGER (HEX) INSERTION FEATURES

(71) Applicant: GM GLOBAL TECHNOLOGY OPERATIONS LLC, Detroit, MI (US)

(72) Inventors: Ulrich Schmieder, Darmstadt (DE); Alastair Gordon Anderson, Wiesbaden (DE); Reiner Essinger, Zwingenberg (DE); Karsten Reinhard Spaeter, Hünstetten (DE); Ralf Lerch, Armsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 459 days.

(21) Appl. No.: 14/025,382

(22) Filed: Sep. 12, 2013

(65) Prior Publication Data

US 2015/0072194 A1    Mar. 12, 2015

(51) Int. Cl.
| | |
|---|---|
| *H01M 2/02* | (2006.01) |
| *H01M 2/10* | (2006.01) |
| *H01M 10/60* | (2014.01) |
| *H01M 10/0525* | (2010.01) |
| *H01M 10/625* | (2014.01) |
| *H01M 2/24* | (2006.01) |
| *H01M 10/647* | (2014.01) |
| *H01M 10/6556* | (2014.01) |
| *H01M 10/6551* | (2014.01) |
| *H01M 10/613* | (2014.01) |
| *H01M 2/20* | (2006.01) |

(52) U.S. Cl.
CPC .............. *H01M 2/1077* (2013.01); *H01M 2/24* (2013.01); *H01M 10/0525* (2013.01); *H01M 10/5016* (2013.01); *H01M 10/613* (2015.04); *H01M 10/647* (2015.04); *H01M 10/6551* (2015.04); *H01M 10/6556* (2015.04); *H01M 2/206* (2013.01); *H01M 2220/20* (2013.01)

(58) Field of Classification Search
None
See application file for complete search history.

(56) References Cited

U.S. PATENT DOCUMENTS

2013/0022859 A1*  1/2013  Lim .................... H01M 2/1061
                                                                     429/159

* cited by examiner

*Primary Examiner* — Cynthia K Walls
(74) *Attorney, Agent, or Firm* — Brooks Kushman P.C.

(57) ABSTRACT

A support frame assembly for holding a plurality of battery cells includes a first end frame having a first plurality of protruding strips, a second end frame having a second plurality of protruding strips, and a structural frame having a plurality of grooves for receiving the first plurality of protruding strips and the second plurality of protruding strips. The first end frame and the second end frame attach to the structural frame to hold a first battery cell, a second battery cell and a foam pad positioned between the first battery cell and the second battery cell. The structural frame has curved features therein for receiving a cooling assembly and a chamfered slot for receiving a cooling fin from the cooling assembly. The support frame assembly also includes interlocking features that mate to another support frame with a gap defined between adjacent support frames.

20 Claims, 7 Drawing Sheets

CELL FRAME FOR EREV GEN2 BATTERY MODULE (LIQUID FIN CONCEPT) WITH HEAT EXCHANGER (HEX) INSERTION FEATURES

TECHNICAL FIELD

In at least one aspect, the present invention is related to battery module assemblies and in particular to frames for holding battery cells together in such assemblies.

BACKGROUND

Large capacity rechargeable batteries are currently being investigated for use in electric vehicles. The ultimate feasibility of electric vehicles depends on significantly reducing the associated costs. Reduction in the costs of battery assemblies is particularly important.

Lithium ion batteries are an important type of battery technology. Most battery assemblies, including lithium ion battery assemblies, include a plurality of individual electrochemical cells. Typically, such electrochemical cells include an anode, a cathode, and a separator interposed between the anode and cathode. Typically, the anode includes a metal sheet or foil (usually copper metal) over-coated with a graphitic layer. Similarly, the cathode usually includes a metal sheet or foil (usually aluminum metal) over-coated with a lithium-containing layer. Finally, electrochemical cells include an electrolyte which is interposed between the anode and the cathode. Terminals allow the generated electricity to be used in an external circuit. Electrochemical cells produce electricity via an electrochemical reaction.

For high power and high energy applications, a plurality of battery cells are utilized and assembled into a battery module. Moreover, such battery modules include a plurality of metallic (e.g., copper and/or aluminum) cooling fins interspersed between battery cells in a parallel wired battery cell pair which are cooled by a recirculating cooling liquid. Compression foam pads are typically interspersed between some battery cell pairs. Due to the large number of components that are required for a battery module, efficient assembling configurations are needed.

Accordingly, there is a need for improved battery module assemblies and for methods of constructing and assembling such battery module assemblies.

SUMMARY

The present invention solves one or more problems of the prior art by providing a support frame assembly for a battery module. The support frame assembly includes a first end frame having a first plurality of protruding strips, a second end frame having a second plurality of protruding strips, a structural frame having a plurality of grooves for receiving the first plurality of protruding strips and second plurality of protruding strips. The first end frame and the second end frame attach to the structural frame to hold a first battery cell, a second battery cell and a foam pad positioned between the first battery cell and the second battery cell. The structural frame has a first sidewall, a second sidewall, a third sidewall, and a fourth sidewall. The first sidewall defines curved features therein for receiving a cooling assembly and a chamfered slot for receiving a cooling fin from the cooling assembly. The support frame assembly also includes interlocking features that mate to another support frame with a gap defined between adjacent support frames.

In another embodiment, a battery module incorporating the support frame assembly is provided. The battery module includes a cooling assembly and a plurality of support frame assemblies. The cooling assembly includes an inlet manifold, an outlet manifold, and a plurality of cooling fins in fluid communication with the inlet manifold and the outlet manifold. As set forth above, each support frame assembly of the plurality of support frame assemblies includes a first end frame having a first plurality of protruding strips, a second end frame having a second plurality of protruding strips, a structural frame having a plurality of grooves for receiving the first plurality of protruding strips and second plurality of protruding strips. The first end frame and the second end frame attach to the structural frame to hold a first battery cell, a second battery cell and a foam pad positioned between the first battery cell and the second battery cell. The structural frame has a first sidewall, a second sidewall, a third sidewall, and a fourth sidewall. The first sidewall defines curved features therein for receiving a cooling assembly and a chamfered slot for receiving a cooling fin from the plurality of cooling fins. The support frame assembly also includes interlocking features that mate to another support frame with a gap defined between adjacent support frames.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application where publications are referenced, the disclosures of these publications in their entireties are hereby incorporated by reference into this application to more fully describe the state of the art to which this invention pertains.

Figure 1A:
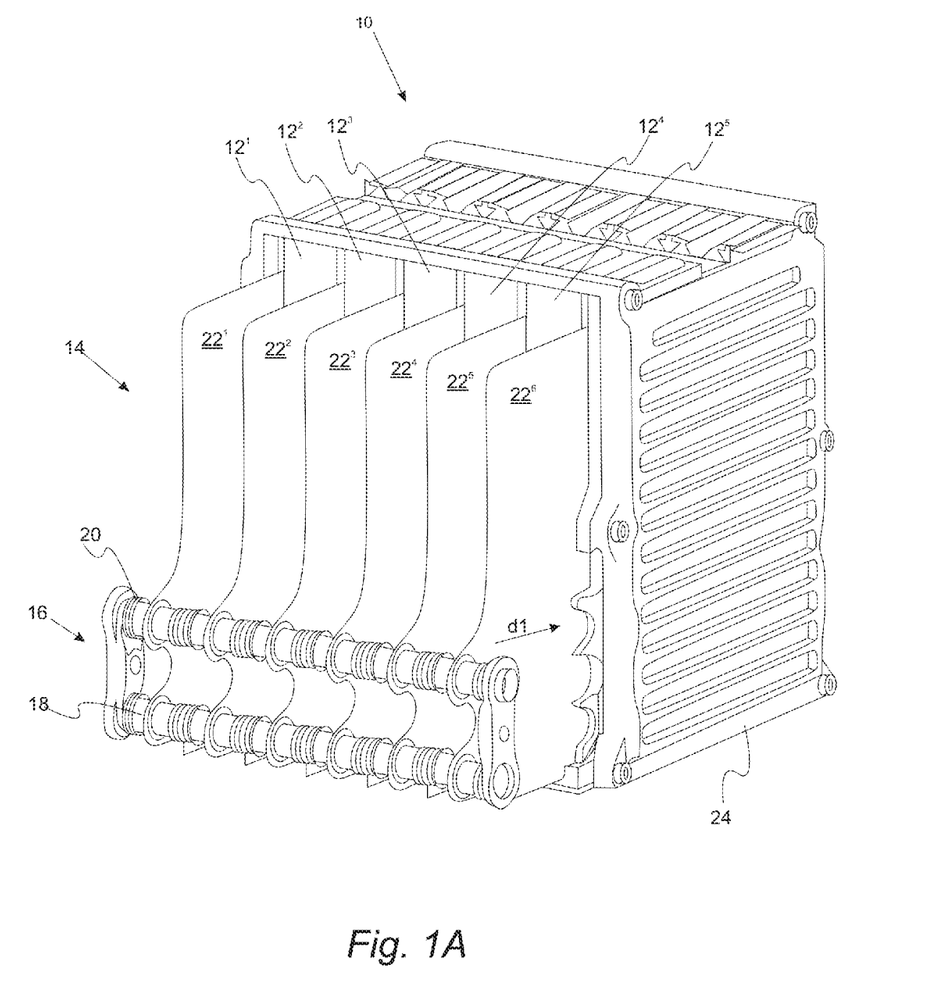
FIG. 1A is a perspective view of a battery module incorporating a support frame and positioned within a housing.
Figure 1B:
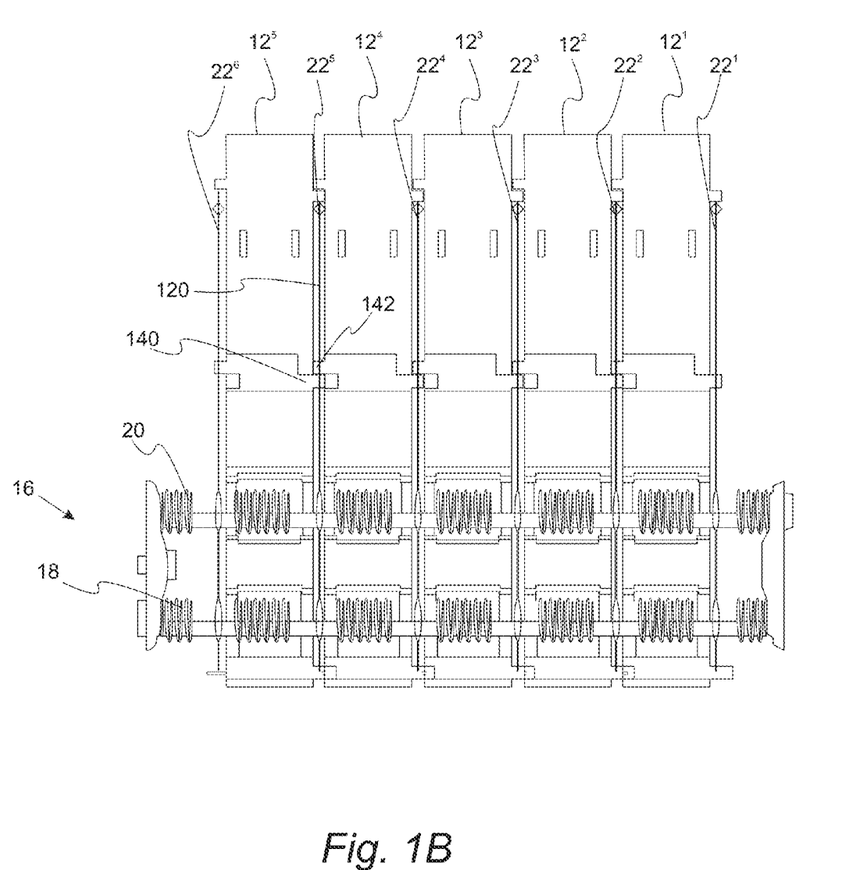
FIG. 1B is a front view of a battery module incorporating a support frame.

With reference to FIGS. 1A and 1B, schematic illustrations of a battery module incorporating a support frame are provided. FIGS. 1A and 1B depict the cooling manifold slightly disassembled. During assembly, cooling manifold 16 is pushed along direction $d_1$. FIG. 1A is a perspective view of the battery module while FIG. 1B is a front view of the battery module. Battery module 10 includes a plurality of support frame assemblies $12^1$, $12^2$, $12^3$, $12^4$ and $12^5$ each of which houses a plurality of battery cells as set forth below in more detail. Although the present invention is not limited to the number of support frame assemblies that are used in a battery module, a typical battery module may include 2 to 10 such frame assemblies with the battery cells disposed therein. Battery module 10 also includes cooling assembly 14 which has a cooling manifold subassembly 16. Cooling manifold subassembly 16 includes inlet manifold 18 for introducing liquid coolant to the cooling assembly and an outlet manifold 20 for exiting coolant from the coolant assembly. Cooling assembly 14 also includes a plurality of cooling fins $22^1$, $22^2$, $22^3$, $22^4$ and $22^5$ attached to inlet manifold 18 and outlet manifold 20. Coolant enters cooling fins $22^1$, $22^2$, $22^3$, $22^4$ and $22^5$ via inlet cooling manifold 18 and then flows through cooling channels in the cooling fins. Coolant exits the cooling fins and enters outlet manifold 20 and then typically recirculated to inlet manifold 18. FIG. 1 depicts the cooling manifold slightly pulled back. During operation, cooling manifold 16 is pushed along direction $d_1$. Cooling fins $22^1$, $22^2$, $22^3$, $22^4$ and $22^5$ are held in place by curved features on support frame assemblies $12^1$, $12^2$, $12^3$, $12^4$ and $12^5$ as set forth below. Support frame assemblies $12^1$, $12^2$, $12^3$, $12^4$ and $12^5$ are enclosed by and held together by housing 24.

Figure 2:
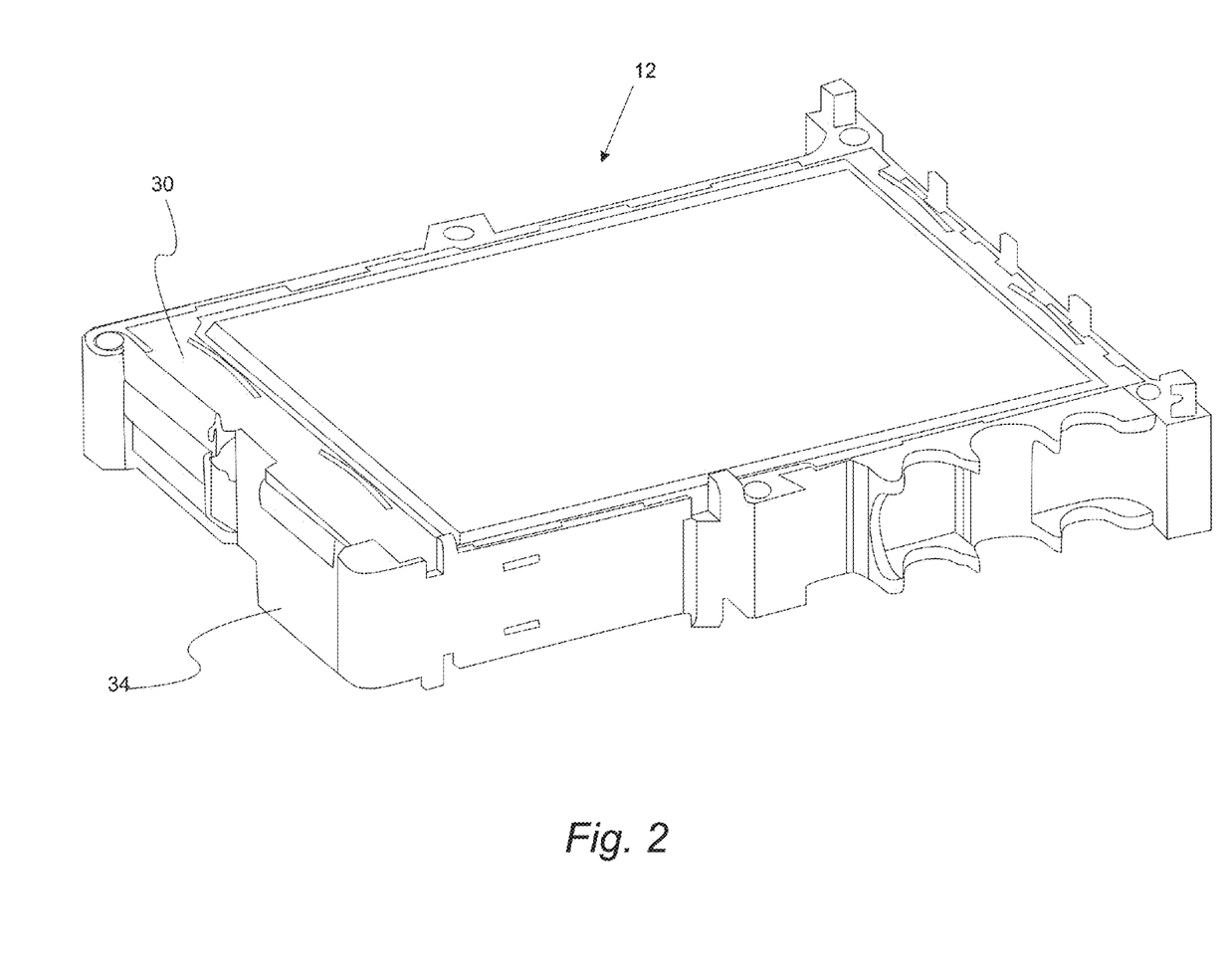
FIG. 2 is a perspective view of a support frame assembly used in the battery module of FIGS. 1A and 1B.
Figure 3:
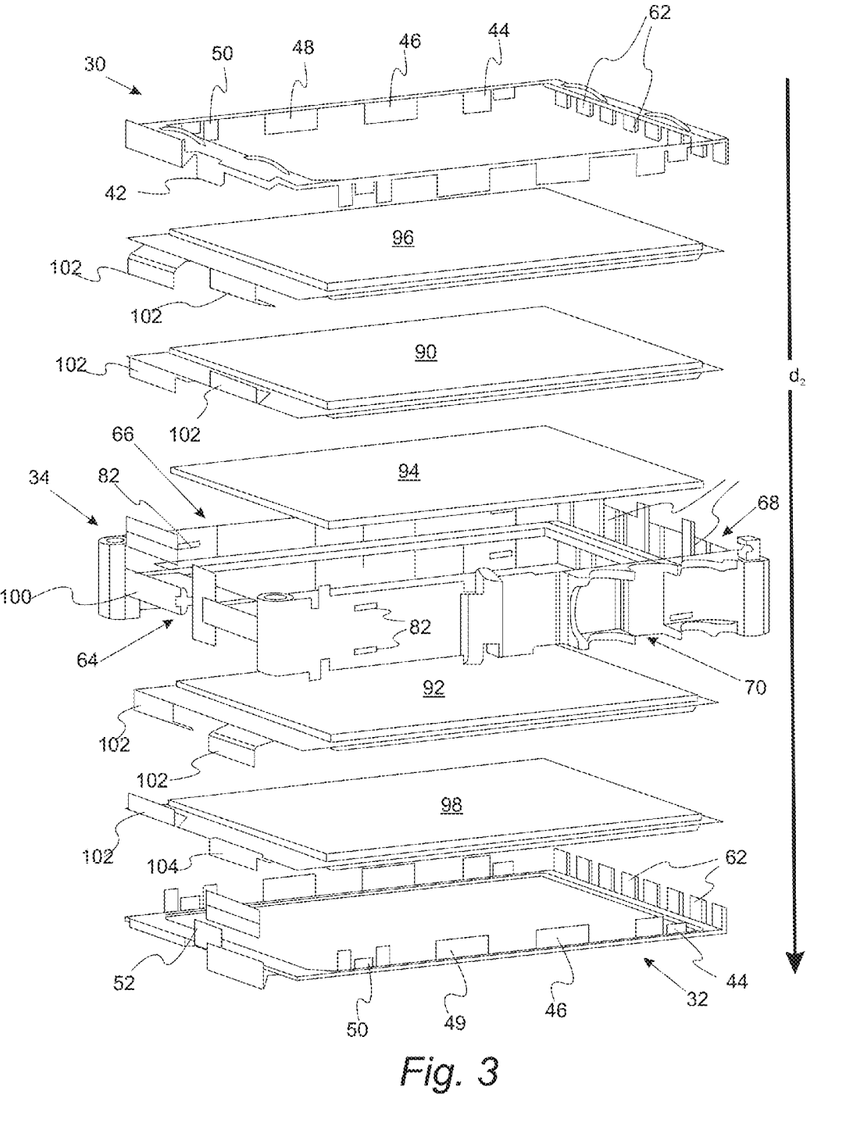
FIG. 3 is an exploded perspective view of the support frame assembly of FIG. 2.

With reference to FIGS. 2 and 3, 4 and 5, schematic illustrations of the support frame assembly used in FIG. 1 are provided. FIG. 2 is a perspective view of the support frame assembly. FIG. 3 is an exploded perspective view of the support frame assembly of FIG. 2. Support frame assembly 12 includes a first end frame 30, second end frame 32, and structural frame 34. First end frame 30 and second end frame 32 are of the same general construction with each independently including sides 36-42. Typically, first end frame 30, second end frame 32, and structural frame 34 are molded from thermoplastic such as polypropylene and polyamide.

Figure 4:
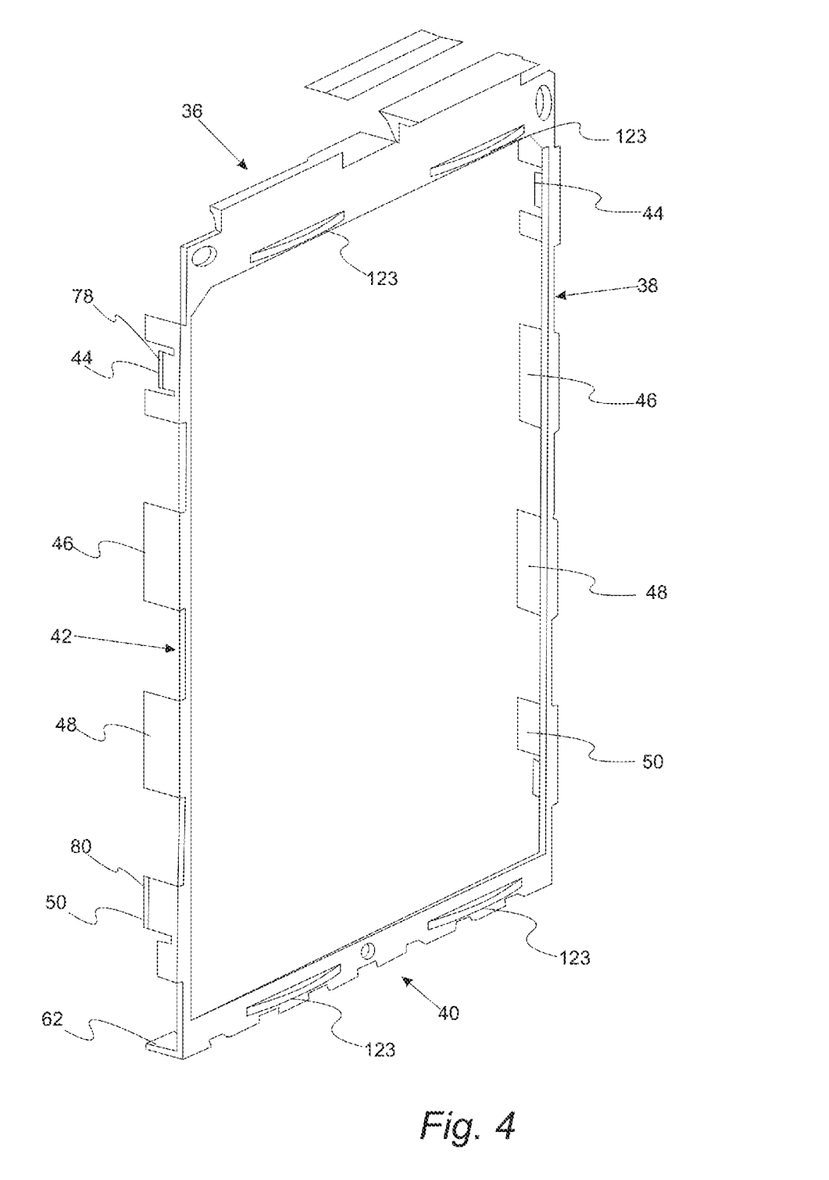
FIG. 4 is a perspective view of an end frame used in the frame assemblies of FIGS. 2 and 3.
Figure 5:
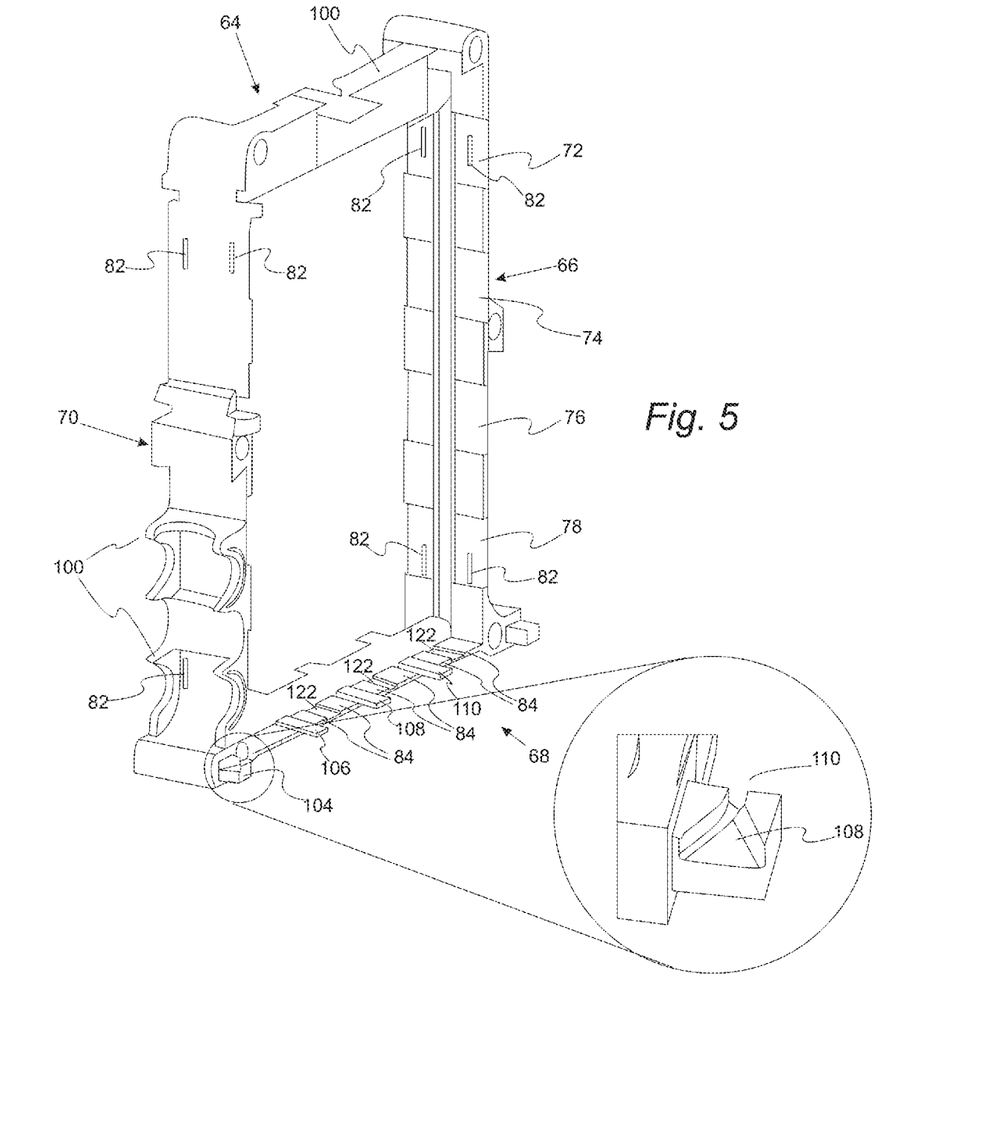
FIG. 5 is a perspective view of a support frame used in the frame assemblies of FIGS. 2 and 3.

With reference to FIGS. 2, 3, 4 and 5, additional details of the support frame assembly are provided. FIG. 4 is a perspective view of an end frame. FIG. 5 is a perspective view of a support frame First end frame 30 includes first plurality of protruding strips 44-50 protruding from sides 38 and second end frame 32 includes second plurality of protruding strips 44-50 protruding from side 42. Characteristically, side 38 is opposite to side 42. In the refinement depicted in the figures, protruding strips 44 and 50 include clip features that attach to support frame 34. First end frame 30 and second end frame 32 also include a plurality of protruding tabs 62 for holding the battery cells in place. Structural frame 34 includes first sidewall 64, second sidewall 66, third sidewall 68, and fourth sidewall 70. Structural frame 34 has a plurality of grooves (i.e., indentations) 72-76 on second sidewall 66 and fourth sidewall 70 for receiving and mating to the first plurality and second plurality of protruding strips. In the refinement depicted in the figures, strips 44 and 50 include a barbed clip section 78, 80 that engages openings 82 as defined in second sidewall 66 and fourth sidewall 70. In a refinement, structural frame 34 has a plurality of receiving features 84 for receiving the protruding tabs 62. First end frame 30 and second end frame 32 attach to the structural frame 34 to hold a first battery cell 90, a second battery cell 92, and foam pad 94 positioned between the first battery cell and the second battery cell. In a refinement, third battery cell 96 and fourth battery cell 98 are also positioned between first end frame 30 and second end frame 32. As depicted in FIG. 3, one or both of battery cells 92, 98 are positioned into second end frame 32. Structural frame 64 is stacked into the end frame. One or both of battery cells 90, 96 are positioned into the other side of structural frame 64 and first end frame 30 stacked thereto. The castellated interlocking features around the end and structure frames allow the battery cell to be positioned into both components with a single design of the end frame.

Figure 6:
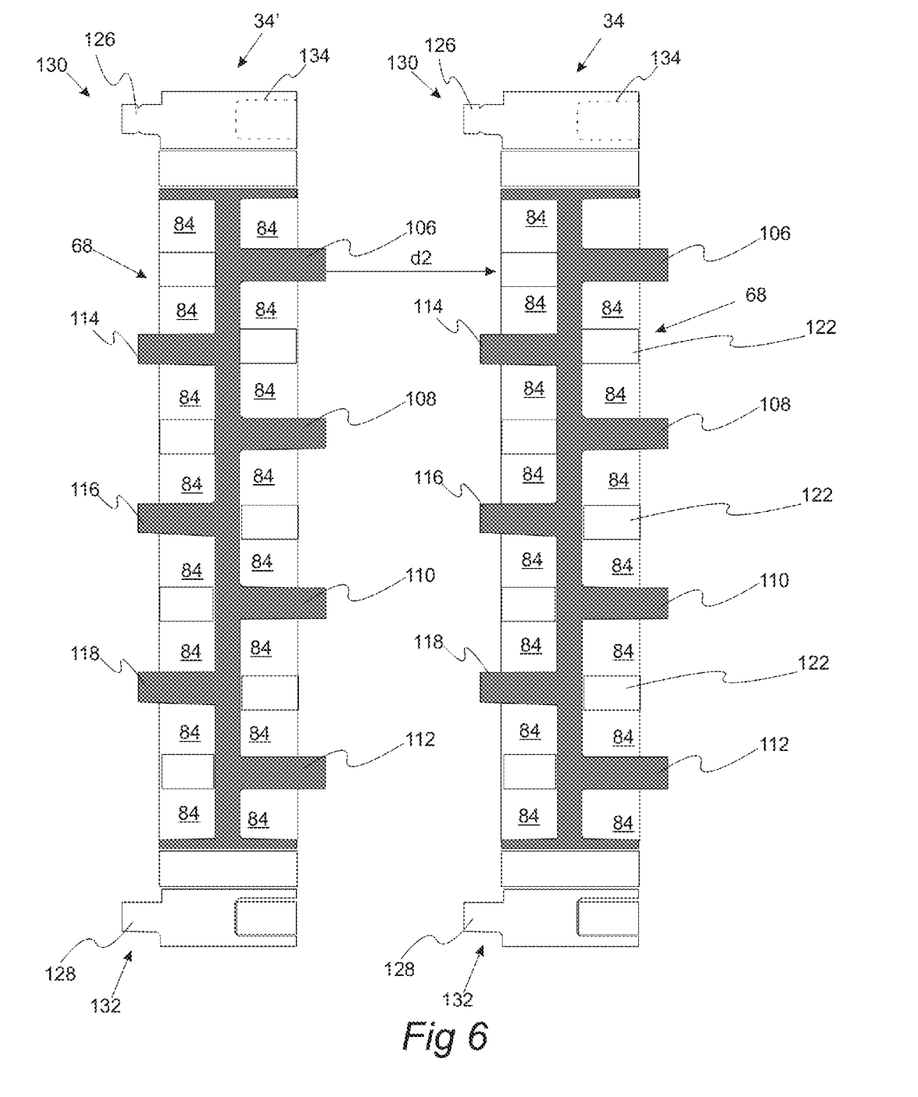
FIG. 6 is a side view of two support frame assemblies attaching together.

With reference to FIGS. 1-6, first sidewall 64 defines curved features 100 therein for receiving cooling assembly 16 and a chamfered slot 104 for receiving a cooling fin $20^i$ (where i is 1-5) from the cooling assembly. Support frame 34 also includes interlocking features 106-118 on sidewall 68 that mate to another support frame with a gap 120 defined between adjacent support frames for accommodating the cooling fins $20^i$. In this regard, interlocking features 106-112 are on opposite edges and offset with respect to interlocking features 114-118. As depicted in FIG. 6, support frames 34 and 34' are pushed together along direction $d_2$ such that interlocking features 106-118 mate to receive slots 122 which are indentations in third sidewall 68. In a variation of the present embodiment, first sidewall 64 includes support feature 100 that allows attachment of battery cell tabs 102 together. In a refinement, battery cell tabs 102 are attached by laser welding. It should be appreciated that support frame assembly 12 is advantageously assembled along a single direction $d_2$ from second end frame 32 to first end frame 30. First end frame 30 and second end frame 32 include flexible elements 123 (i.e., spring elements) which assist in assembling a battery module such that the cooling fins slide along these springs to avoid contact to the battery cell surfaces.

Structural frame 34 also includes corner attachment features 126, 128 which are protrusions located at corners 130, 132 of support frame 34 that are received by mating slots 134, 136. Finally, structural frame 34 also includes interlocking features 140, 142 which also interlock together to attach two structural frames together.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A support frame assembly for a battery module, the support frame assembly comprising:
  a first end frame having a first plurality of protruding strips;
  a second end frame having a second plurality of protruding strips; and
  a structural frame having a plurality of grooves for receiving the first plurality of protruding strips and the second plurality of protruding strips, the first end frame and the second end frame attaching to the structural frame to hold a first battery cell, a second battery cell and a foam pad positioned between the first battery cell and the second battery cell, the structural frame having a first sidewall, a second sidewall, a third sidewall, and a fourth sidewall, the first sidewall having curved features therein for receiving a cooling assembly and a chamfered slot for receiving a cooling fin from the cooling assembly, the structural frame also including interlocking features mating to another support frame with a gap defined between adjacent support frames.

2. The support frame assembly of claim 1 wherein the second sidewall includes a support feature that allows attachment of battery cell tabs.

3. The support frame assembly of claim 2 wherein the battery cell tabs are attached by laser welding.

4. The support frame assembly of claim 1 wherein the chamfered slot provides a lead in guide for the cooling fins and wherein the structural frame defines a channel for holding the cooling fin in the gap without the cooling fin contacting a battery cell.

5. The support frame assembly of claim 1 wherein the first end frame and the second end frame attach to the structural frame to further hold a third battery cell and a fourth battery cell in addition to the first battery cell and the second battery cell.

6. The support frame assembly of claim 1 wherein the second battery cell is positioned into the second end frame, the structural frame is stacked into the second end frame, the first battery cell is positioned over an opposite side of structural frame with the first end frame stacked thereto.

7. The support frame assembly of claim 1 wherein the first end frame and the second end frame each independently include a first side, a second side, a third side and a fourth side with the first plurality of protruding strips extending from the second side and fourth side of the first end frame and the second plurality of protruding strips extending from the second side and fourth side of the second end frame.

8. The support frame assembly of claim 7 wherein the second sidewall and the fourth sidewall of the structural frame each independently have a plurality of grooves for receiving the first plurality of protruding strips of the first end frame and the second plurality of protruding strips of the second end frame.

9. The support frame assembly of claim 8 wherein the first end frame has a first plurality of tabs extending from the third side of the first end frame, the second end frame has a second plurality of tabs extending from the third side of the second end frame, the first plurality of tabs and the second plurality of tabs contacting receiving features in the third sidewall of the structural frame.

10. The support frame assembly of claim 1 wherein the first plurality of protrusions and the second plurality of protruding strips each independently include a protrusion having a clip section that attaches to openings defined in the structural frame.

11. The support frame assembly of claim 1 wherein the structural frame further comprises a interlocking feature at a corner for attaching an adjacent frame assembly.

12. The support frame assembly of claim 1 wherein the first end frame and the second end frame each independently include spring elements allowing cooling fins to slide between support frame assemblies without contacting a battery cell surface.

13. A battery module comprising
a cooling assembly having an inlet manifold, an outlet manifold, and a plurality of cooling fins in fluid communication with the inlet manifold and the outlet manifold;
a plurality of support frame assemblies, each support frame assembly of the plurality of support frame assemblies including:
a first end frame having a first plurality of protruding strips;
a second end frame having a second plurality of protruding strips; and
a structural frame having a plurality of grooves for receiving the first plurality of protruding strips and the second plurality of protruding strips, the first end frame and the second end frame attaching to the structural frame to hold a first battery cell, a second battery cell and a foam pad positioned between the first battery cell and the second battery cell, the structural frame having a first sidewall, a second sidewall, a third sidewall, and a fourth sidewall, the first sidewall having curved features therein for receiving the cooling assembly and a chamfered slot for receiving a cooling fin from the plurality of cooling fins, the structural frame also including interlocking features mating to another support frame with a gap defined between adjacent support frames.

14. The battery module of claim 13 wherein the plurality of support frame assemblies includes from 2 to 10 support frame assemblies.

15. The battery module of claim 13 wherein the second sidewall includes a support feature that allows attachment of battery cell tabs.

16. The battery module of claim 13 wherein the first end frame and the second end frame attach to the structural frame to further hold a third battery cell and a fourth battery cell in addition to the first battery cell and the second battery cell.

17. The battery module of claim 13 wherein the first end frame and the second end frame each independently include a first side, a second side, a third side and a fourth side with the first plurality of protruding strips extending from the second side and fourth side of the first end frame and the second plurality of protruding strips extending from the second side and fourth side of the second end frame.

18. The battery module of claim 17 wherein the second sidewall and the fourth sidewall of the structural frame each independently have a plurality of grooves for receiving the first plurality of protruding strips of the first end frame and the second plurality of protruding strips of the second end frame.

19. The battery module of claim 18 wherein the first end frame has a first plurality of tabs extending from the third side of the first end frame, the second end frame has a second plurality of tabs extending from the third side of the second end frame, the first plurality of tabs and the second plurality of tabs contacting receiving features in the third sidewall of the structural frame.

20. The battery module of claim 12 wherein the first plurality of protruding strips and the second plurality of protruding strips each independently include a protrusion having a clip section that attaches to openings defined in the structural frame.

* * * * *